United States Patent
Wang et al.

(10) Patent No.: US 10,820,350 B2
(45) Date of Patent: Oct. 27, 2020

(54) DATA TRANSMISSION METHOD AND DEVICE

(71) Applicant: China Academy of Telecommunications Technology, Beijing (CN)

(72) Inventors: Jiaqing Wang, Beijing (CN); Xueming Pan, Beijing (CN); Weijie Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 23 days.

(21) Appl. No.: 15/749,056

(22) PCT Filed: Jul. 18, 2016

(86) PCT No.: PCT/CN2016/090306
§ 371 (c)(1),
(2) Date: Jan. 30, 2018

(87) PCT Pub. No.: WO2017/020695
PCT Pub. Date: Feb. 9, 2017

(65) Prior Publication Data
US 2018/0220464 A1  Aug. 2, 2018

(30) Foreign Application Priority Data

Jul. 31, 2015 (CN) .......................... 2015 1 0464450

(51) Int. Cl.
*H04W 74/08* (2009.01)
*H04L 5/00* (2006.01)
*H04W 74/00* (2009.01)

(52) U.S. Cl.
CPC ....... *H04W 74/0825* (2013.01); *H04L 5/0048* (2013.01); *H04W 74/004* (2013.01); *H04W 74/006* (2013.01); *H04W 74/0808* (2013.01)

(58) Field of Classification Search
CPC .............. H04L 5/0048; H04W 74/004; H04W 74/006; H04W 74/0808; H04W 74/0825
See application file for complete search history.

(56) References Cited

U.S. PATENT DOCUMENTS

| 10,057,779 B2* | 8/2018 | Wei ....................... H04J 3/1694 |
| 2010/0220694 A1* | 9/2010 | Huang .............. H04W 56/0005 370/336 |

(Continued)

FOREIGN PATENT DOCUMENTS

| CN | 104486013 | 4/2015 |
| CN | 104812049 | 7/2015 |

(Continued)

OTHER PUBLICATIONS

Beluri et al., "Mechanisms for LTE Coexistence in TV White Space", InterDigital Communications, LLC, 2012 IEEE International Symposium on Dynamic Spectrum Access Networks, 10 pages.

(Continued)

*Primary Examiner* — Steven H Nguyen
(74) *Attorney, Agent, or Firm* — Foley & Lardner LLP

(57) ABSTRACT

The present invention discloses a data transmission method and device configured to address the problems in LTE-U employing the existing channel access mechanism, in which poor channel access capacity is caused, and congestion between UEs in the same cell is likely to occur if multiple UEs cannot access at the same time. The method comprises: sending, by a communication device, a signal during a GP between a downlink subframe and an uplink subframe to occupy a current channel; and transmitting, by the commu- (Continued)

nication device, data via the current channel. The solution provided in embodiments of the present invention has low implementation complexity, and can address the problem of UL having a poorer opportunity to access than WIFI, thus facilitating the implementation of MU-FDM and MU-SDM to prevent significant degradation of LAA performance and a waste of radio resources.

6 Claims, 4 Drawing Sheets

(56) References Cited

U.S. PATENT DOCUMENTS

| | | | |
|---|---|---|---|
| 2011/0134895 A1 | 6/2011 | Sakaguchi et al. | |
| 2011/0261728 A1* | 10/2011 | Ribeiro | H04W 28/26 370/280 |
| 2015/0201431 A1 | 7/2015 | Um et al. | |
| 2015/0223075 A1* | 8/2015 | Bashar | H04W 16/14 370/329 |
| 2015/0250002 A1* | 9/2015 | Sun | H04W 74/0808 370/329 |
| 2016/0142920 A1* | 5/2016 | Suzuki | H04W 16/14 370/336 |
| 2016/0353437 A1* | 12/2016 | Sun | H04W 74/0808 |
| 2017/0034817 A1* | 2/2017 | Park | H04L 5/001 |
| 2017/0085346 A1* | 3/2017 | Tiirola | H04W 28/26 |
| 2017/0142743 A1* | 5/2017 | Yoon | H04L 5/0048 |
| 2017/0265095 A1* | 9/2017 | Harada | H04W 16/14 |

FOREIGN PATENT DOCUMENTS

| | | |
|---|---|---|
| CN | 105721376 | 6/2016 |
| EP | 1 289 194 A1 | 3/2003 |
| EP | 3 163 967 A1 | 5/2017 |
| JP | 2007-037128 A | 2/2007 |
| WO | WO-2014/189916 A2 | 11/2014 |

OTHER PUBLICATIONS

Ratasuk et al., "License-Exempt LTE Deployment in Heterogeneous Network", Nokia Siemens Networks; Nokia Research Center; IEEE 2012, 6 pages.

CATT, "Listen Before Talk for LAA", 3GPPTSG RANWGI Meeting #79 RI-144625, 1-26, Nov. 21, 2014 (Nov. 21, 2014), section 2.4 (pp. 6).

CATT, CATR ,Frame structure considerations for LAA[online], 3GPP TS G-RAN WG1#81 R1-152580 dtd May 29, 2015.

* cited by examiner

DATA TRANSMISSION METHOD AND DEVICE

This application is a US National Stage of International Application No. PCT/CN2016/090306, filed on Jul. 18, 2016, designating the United States, and claiming the benefit of Chinese Patent Application No. 201510464450.0, filed with the Chinese Patent Office on Jul. 31, 2015 and entitled "A method and device for transmitting data", which is hereby incorporated by reference in its entirety.

FIELD

The present invention relates to the field of communications, and particularly to a method and device for transmitting data.

BACKGROUND

As there is a constantly growing amount of mobile data traffic, spectrum resources become increasingly insufficient, and the demand for the traffic may not have been satisfied by deploying a network and transmitting service only over licensed spectrum resources, so the deployment of transmission over unlicensed spectrum resources can be considered in a Long Term Evolution (LTE) system, i.e., Unlicensed LTE (U-LTE or LTE-U), to thereby improve a user experience, and extend a coverage area. No particular application system has been planned over the unlicensed spectrum resources, and various wireless communication systems, e.g., Bluetooth, WIFI, etc., can share the unlicensed spectrum resources, where the various systems access the shared unlicensed spectrum resources by preempting the resources.

In order to provide a flexible, and fair adaptive channel access mechanism, the Listen Before Talk (LBT) technology is required in Europe to be applied in the unlicensed frequency bands of 5150 to 5350 MHz, and 5470 to 5725 MHz, and in the LBT procedure, each equipment going to occupy a channel performs Clear Channel Assessment (CCA) detection, like the Carrier Sense Multiple Access/Collision Detection (CSMA/CA) mechanism in Wireless Fidelity (WIFI). The CCA determines whether there is a signal being transmitted over the current channel by energy detection to thereby determine whether the channel is occupied. Equipments in an unlicensed frequency band are categorized in the European Telecommunication Standardization Institute (ETSI) standard into frame-based and load-based equipments corresponding respectively to two access mechanisms: Frame Based Equipments (FBE) and Load Based Equipments (LBE).

Since an LTE-U system is a network system controlled by a central node, a User Equipment (UE) can contend for a channel only after it is scheduled by an eNB, and can receive an uplink (UL) grant successfully, so there is such an uplink access occasion in the LTE-U system that is incomparable to that in WIFI. If the LTE-U system operates with the existing channel access mechanism, then since the UL Multiple User-Frequency Division Multiplexing (MU-FDM) and UL Multiple User-Space Division Multiplexing (MU-SDM) modes are required to be supported in the LTE-U system, if a plurality of user equipments cannot access at the same time, then the user equipment the first to access the channel will be the first to transmit a signal, so a subsequent user equipment for which an Enhanced CCA (ECCA) access procedure has not been finished may be blocked from accessing the channel, thus degrading the performance of a Licensed Assisted Access (LAA).

Apparently there is a low channel access capacity in the LTE-U system operating with the existing channel access mechanism, and if a plurality of user equipments cannot access at the same time, then one user equipment may tend to be blocked by another user equipment in the same cell.

SUMMARY

Embodiments of the invention provide a method and apparatus for transmitting data so as to address the problem in the prior art that there is such a low channel access capacity in the LTE-U system operating with the existing channel access mechanism that if a plurality of user equipments can not access at the same time, then one user equipment may tend to be blocked by another user equipment in the same cell.

An embodiment of the invention provides a method for transmitting data, the method including:

transmitting, by a communication device, a signal in a switching duration between a downlink sub-frame and an uplink sub-frame to occupy a current channel; and transmitting, by the communication device, data over the current channel.

In a preferred implementation, the signal includes a reservation signal indicating that the current channel is occupied.

Preferably if the communication device is a network device, then the signal further includes a downlink signal transmitted from the network device to a User Equipment (UE); and if the communication device is a UE, the signal further includes an uplink signal transmitted from the UE to a network device.

Preferably the communication device is a network device, start time of a signal transmission is start time of a switching duration, and there is a first interval between end time of the signal transmission and end time of the switching duration, where a length of the first interval is less than or equal to that of a preset interval of time, more than or equal to a smallest length of guard.

Preferably if the communication device is a network device, then a sum of length of a second interval and a first interval is less than or equal to that of a preset interval of time, and the length of the first interval is more than or equal to a smallest length of guard; or if the communication device is a UE, then the sum of the length of the second interval and the first interval is less than or equal to that of the preset interval of time, and the length of the second interval is more than or equal to the smallest length of guard;

where the length of the first interval is a length of interval between end time of the signal transmission and end time of the switching duration, and the length of the second interval is a length of interval between start time of a signal transmission and start time of the switching duration.

Preferably the communication device is a UE, there is a second interval between start time of the signal transmission and start time of the switching duration, where a length of the second interval is less than or equal to that of a preset interval of time, and more than or equal to a smallest length of guard.

Preferably the communication device is a UE;

before the communication device transmits the signal in the switching duration, the method further includes: performing, by the communication device, Clear Channel Assessment, CCA, detection on the current channel in a timeslot for channel detection in the switching duration; and transmitting, by the communication device, the signal in the switching duration includes: transmitting, by the communication device, the signal in the switching duration if the current channel being idle is detected.

In another preferred implementation, the communication device is a UE, the signal is an uplink signal to be transmitted by the UE to a network device in an uplink sub-frame following an end of the switching duration, and a length of a second interval between the start time of a signal transmission, and start time of the switching duration is less than or equal to that of a preset interval of time.

An embodiment of the invention provides a method for transmitting data, the method including:

determining, by a UE, an uplink signal transmitted to a network device; and transmitting, by the UE, the uplink signal in a switching duration between a downlink sub-frame and an uplink sub-frame, or after the switching duration.

Preferably a length of interval between start time of the uplink signal transmission, and end time of signal transmission performed by the network device in the switching duration is more than or equal to a preset length of guard.

Preferably before the UE transmits the uplink signal, the method further includes: performing, by the UE, CCA detection in a timeslot for channel detection in the switching duration; and transmitting, by the UE, the uplink signal includes: transmitting, by the UE, the uplink signal over a current channel if the current channel being idle is detected.

Preferably the signal transmitted by the network device includes a reservation signal indicating that the current channel is occupied; and the signal transmitted by the UE includes the reservation signal indicating that the current channel is occupied, or the uplink signal transmitted by the user equipment to the network device.

Preferably the signal transmitted by the network device further includes a downlink signal transmitted by the network device to the UE.

An embodiment of the invention provides a communication device including:

a signal transmitting module configured to transmit a signal in a switching duration between a downlink sub-frame and an uplink sub-frame to occupy a current channel; and a data transmitting module configured to transmit data over the current channel.

In a preferred implementation, the signal includes a reservation signal indicating that the current channel is occupied.

Preferably if the communication device is a network device, then the signal further includes a downlink signal transmitted from the network device to a UE; and if the communication device is a UE, the signal further includes an uplink signal transmitted from the UE to a network device.

Preferably the communication device is a network device, start time of the signal transmission is start time of the switching duration, there is a first length of interval between end time of the signal transmission and the end time of the switching duration, where a length of the first interval is less than or equal to that of a preset interval of time, and more than or equal to the smallest length of guard.

Preferably if the communication device is a network device, then a sum of length of a second interval and a first interval is less than or equal to that of a preset interval of time, and the length of the first interval is more than or equal to a smallest length of guard; or if the communication device is a UE, then the sum of the length of the second interval and the first interval is less than or equal to that of a preset interval of time, and the length of the second interval is more than or equal to the smallest length of guard;

where the length of the first interval is the length of interval between end time of the signal transmission, and end time of the switching duration, and the length of the second interval is a length of interval between start time of the signal transmission, and start time of the switching duration.

Preferably the communication device is a UE, there is a second interval between start time of the signal transmission and start time of the switching duration, where a length of the second interval is less than or equal to that of a preset interval of time, and more than or equal to a smallest length of guard.

Preferably the communication device is a UE, and the communication device further includes:

a CCA detecting module configured to perform CCA detection on the current channel in a timeslot for channel detection in the switching duration; and the signal transmitting module is configured to transmit the signal in the switching duration if the CCA detecting module detects the current channel being idle.

In another preferred implementation, the communication device is a UE, the signal is an uplink signal to be transmitted by the UE to a network device in an uplink sub-frame following an end of the switching duration, and a length of a second interval between start time of the signal transmission, and start time of the switching duration is less than or equal to that of a preset interval of time.

An embodiment of the invention provides a user equipment including:

an uplink signal determining module configured to determine an uplink signal to be transmitted to a network device; and an uplink signal transmitting module configured to transmit the uplink signal in a switching duration between a downlink sub-frame and an uplink sub-frame, or after of the switching duration.

Preferably a length of interval between the start time of the uplink signal transmission, and end time of a signal transmission performed by the network device in the switching duration is more than or equal to a preset length of guard.

Preferably the UE further includes:

a CCA detecting module configured to perform CCA detection in a timeslot for channel detection in the switching duration; and the uplink signal transmitting module is configured to transmit the uplink signal over a current channel if the CCA detecting module detects the current channel being idle.

Preferably the signal transmitted by the network device includes a reservation signal indicating that the current channel is occupied; and the signal transmitted by the UE includes a reservation signal indicating that the current channel is occupied, or the uplink signal transmitted by the user equipment to the network device.

Preferably the signal transmitted by the network device further includes a downlink signal transmitted by the network device to the UE.

An embodiment of the invention provides another communication device including a transceiver, and at least one processor connected with the transceiver, where:

the processor is configured to read and execute program in a memory:

to trigger the transceiver to transmit a signal in a switching duration between a downlink sub-frame and an uplink sub-frame to occupy a current channel; and to transmit data over the current channel.

In a preferred implementation, the signal includes a reservation signal indicating that the current channel is occupied.

Preferably if the communication device is a network device, then the signal further includes a downlink signal transmitted from the network device to a UE; and if the communication device is a UE, then the signal further includes an uplink signal transmitted from the UE to a network device.

Preferably the communication device is a network device, the start time of the signal transmission is the start time of the switching duration, and there is a first interval between the end time of the signal transmission and the end time of the switching duration, where the length of the first interval is less than or equal to that of a preset interval of time, and more than or equal to the smallest length of guard.

Preferably if the communication device is a network device, then a sum of length of a second interval and a first interval is less than or equal to that of a preset interval of time, and the length of the first interval is more than or equal to that of the smallest length of guard; or if the communication device is a UE, then the sum of the length of the second interval and the first interval is less than or equal to that of the preset interval of time, and the length of the second interval is more than or equal to the smallest length of guard;

where the length of the first interval is the length of interval between end time of the signal transmission, and end time of the switching duration, and the length of the second interval is the length of interval between start time of the signal transmission, and start time of the switching duration.

Preferably the communication device is a UE, there is a second interval between start time of the signal transmission and start time of the switching duration, where the length of the second interval is less than or equal to that of a preset interval of time, and more than or equal to the smallest length of guard.

Preferably the communication device is a UE, and the processor is further configured: to perform CCA detection on the current channel in a timeslot for channel detection in the switching duration; and to trigger the transceiver to transmit the signal in the switching duration if the current channel being idle is detected.

In another preferred implementation, the communication device is a UE, the signal is an uplink signal to be transmitted by the UE to a network device in an uplink sub-frame following the end of the switching duration, and a length of a second interval between the start time of the signal transmission, and the start time of the switching duration is less than or equal to that of a preset interval of time.

An embodiment of the invention provides another user equipment including a transceiver, and at least one processor connected with the transceiver, where:

the processor is configured to read and execute program in a memory: to determine an uplink signal to be transmitted to a network device; and to trigger the transceiver to transmit the uplink signal in a switching duration between a downlink sub-frame and an uplink sub-frame, or after the switching duration.

Preferably the length of the interval between the start time of the uplink signal transmission and the end time of a signal transmission performed by the network device in the switching duration is more than or equal to that of a preset length of guard.

Preferably the processor is further configured:

to perform CCA detection in a timeslot for channel detection in the switching duration; and to transmit the uplink signal over the current channel if the current channel being idle is detected.

Preferably the signal transmitted by the network device includes a reservation signal indicating that the current channel is occupied; and the signal transmitted by the UE includes a reservation signal indicating that the current channel is occupied, or the uplink signal transmitted by the user equipment to the network device.

Preferably the signal transmitted by the network device further includes a downlink signal transmitted by the network device to the UE.

In the embodiments of the invention, the communication device transmits a signal in a switching duration between a downlink sub-frame and an uplink sub-frame to occupy the current channel; and the communication device transmits data over the current channel. Apparently the solutions according to the embodiments of the invention can be implemented at low complexity, and can address the problem of a UL access occasion inferior to that in WIFI, enable the MU-FDM and MU-SDM modes, and avoid a great loss of LAA performance, and a waste of radio resources.

DETAILED DESCRIPTION OF THE EMBODIMENTS

In the embodiments of the invention, a base station and/or a UE transmits a signal in a switching duration between a downlink sub-frame and an uplink sub-frame in an unlicensed frequency band to occupy the current channel, so that it can access the current channel, and transmit data, and this solution can be implemented at low complexity, and can address the problem of an uplink (UL) access occasion inferior to that in WIFI, enable the MU-FDM and MU-SDM modes, and avoid a great loss of LAA performance, and a waste of radio resources. The switching duration as referred to in the embodiments of the invention, e.g., a Guard Period (GP), can also be referred to as a switching period of time between a downlink sub-frame and an uplink sub-frame.

The embodiments of the invention will be described below in further details with reference to the drawings by way of an example in which the switching duration is a GP. It shall be noted that the embodiments described here are merely intended to illustrate and explain the invention, but not to limit the invention thereto.

Figure 1:
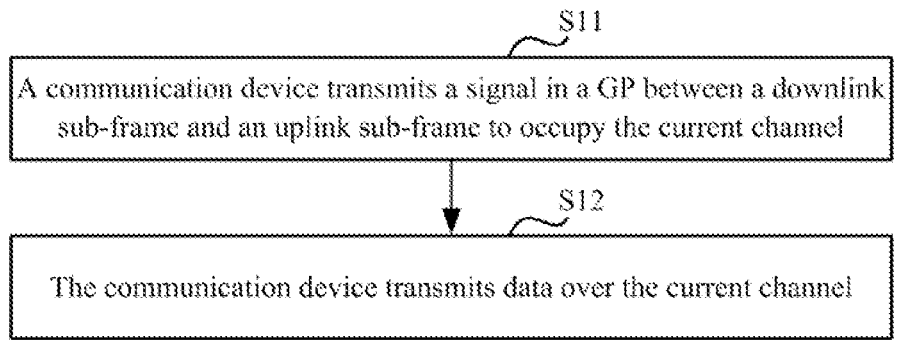
FIG. 1 shows a schematic flow chart of a first method for transmitting data according to an embodiment of the invention.

As illustrated in FIG. 1, a method for transmitting data according to an embodiment of the invention includes:

in the operation S11, a communication device transmits a signal in a GP between a downlink sub-frame and an uplink sub-frame to occupy the current channel; and in the operation S12, the communication device transmits data over the current channel.

In the embodiment of the invention, the communication transmits a signal in a GP between a downlink sub-frame and an uplink sub-frame to occupy the current channel; and the communication transmits data over the current channel. Apparently the solution according to the embodiment of the invention can be implemented at low complexity, and can address the problem of a UL access occasion inferior to that in WIFI, enable the MU-FDM and MU-SDM modes, and avoid a great loss of LAA performance, and a waste of radio resources.

It shall be noted that in order to avoid crosstalk between the uplink and the downlink while switching from a downlink sub-frame to an uplink sub-frame in the LTE Time Division Duplex (TDD) transmission mode, a GP needs to be configured between the downlink sub-frame and the uplink sub-frame. The GP is located in a special sub-frame, and the size thereof is determined by a coverage area of a base station; and the GP is of at least one Orthogonal Frequency Division Multiplex (OFDM) symbol in the existing LTE protocol. As specified in the existing LTE protocol, the GP is an idle period, and there is no signal to be transmitted in the GP in a licensed frequency band; but a WIFI device may possibly access the current channel in this period of time in an unlicensed frequency band, and if no LBT operation is expected to be performed in UL transmission, then there may be a period of time of only approximately 20 μs allowed between the downlink (DL) and the UL, so in order to avoid the WIFI device from accessing the current channel, a signal can be transmitted in the GP to occupy the current channel, so that the WIFI device detecting the channel can detect the signal, and thus the WIFI device will not occupy the channel.

Of course, the embodiment of the invention can be applicable to another transmission mode in addition to the LTE TDD transmission mode in an unlicensed frequency band, as long as the transmission mode is such one that in which a GP is configured between a downlink sub-frame and an uplink sub-frame in an uplink and downlink sub-frame configuration.

In an implementation, the communication device can be a network device, e.g., an base station, etc.; or the communication device can be a user equipment. The two instances, in which the communication device is a network device, and the communication device is a UE, will be described below respectively in details.

In the first instance, the communication device is a network device.

Preferably the signal transmitted by the network device in the GP includes a reservation signal indicating that the current channel is occupied.

Preferably the reservation signal occupies at least a partial OFDM symbol, that is, the reservation signal occupies at least a part of the OFDM symbol.

If the GP is more than one OFDM symbol, then preferably the signal transmitted by the network device in the GP will further include a downlink signal transmitted from the network device to a user equipment. For example, the network device further transmits a pilot signal in the GP to assist the user equipment in being synchronized, etc.

In an implementation, the network device transmits the signal in the GP in the following two preferable schemes.

In a first scheme, the start time of the signal transmission performed by the network device in the GP is the start time of the GP, and there is a first interval between the end time of the signal transmission performed by the network device in the GP and the end time of the GP, where the length of the first interval is less than or equal to that of a preset interval of time, and more than or equal to the smallest length of guard.

In the embodiment of the invention, the preset interval of time is the largest interval of time in which no CCA detection is performed before the channel is allowed to be occupied.

In the embodiment of the invention, the smallest length of guard is dependent upon a coverage distance of the system, where the larger the coverage distance is, the larger the smallest length of guard is. The length of the GP is more than or equal to the smallest length of guard, and the GP includes at least one OFDM symbol.

Preferably in this scheme, the UE may perform uplink transmission without CCA detection in the preset interval of time following the end of a DL signal transmission performed by the network device.

Preferably the start time of a UL signal transmission performed by the UE is the start time of a uplink sub-frame following the end of the GP, or the start time of a UL signal transmission performed by the UE is in the GP.

Figure 2A:
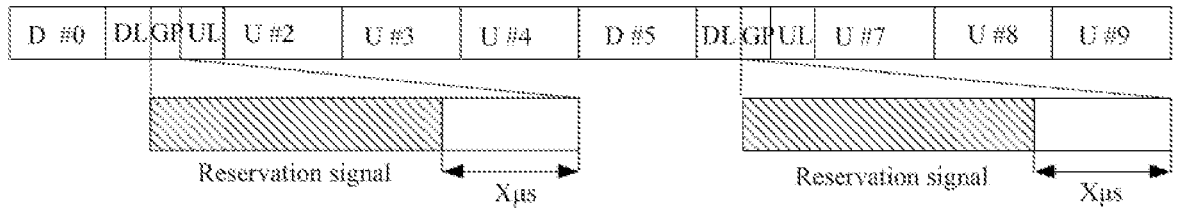
FIG. 2A shows a schematic diagram depicting a first mode in which a signal is transmitted by a network device in a GP according to an embodiment of the invention.

By way of an example, as illustrated in FIG. 2A, the GP is in a special sub-frame, and the base station transmits the reservation signal at the start time of the GP and ends the transmission at the time Xμs (i.e., the first length of interval) before the end time of the GP, where X is less than or equal to the preset interval of time. Accordingly the successfully scheduled UE may perform uplink transmission without CCA detection at the end of the signal transmission performed by the base station. The frame structure has been illustrated schematically, but will not be limited thereto, and the embodiment of the invention can also be applicable to another frame structure which is configured otherwise.

In another preferred implementation, the method further includes:

the UE performs CCA detection in a timeslot for channel detection, where the timeslot for channel detection is located in the GP, or in a sub-frame following the end of the GP; and if the current channel being idle is detected, then the UE will transmit the signal over the current channel; or if the current channel being occupied is detected, then the UE will not occupy the current channel.

Figure 2B:
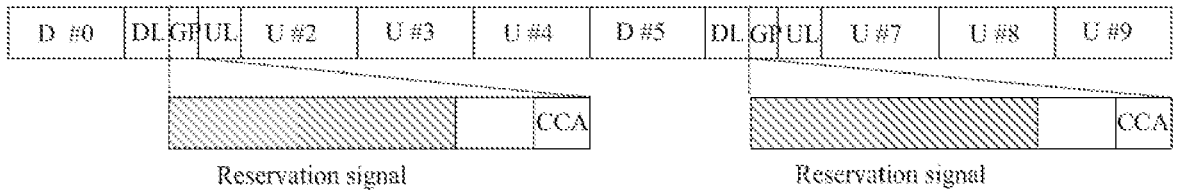
FIG. 2B shows a schematic diagram depicting a second mode in which a signal is transmitted by a network device in a GP according to an embodiment of the invention.

By way of an example, as illustrated in FIG. 2B, the base station firstly transmits the reservation signal in the GP, and the successfully scheduled UE detects the current channel in a CCA timeslot in the GP; and if the current channel is idle, then the UE will access the channel, or if the current channel is busy, then the UE will abort the current access. The UE transmits a signal immediately after accessing the channel in the GP, where the signal may be one of a reservation signal, uplink data, or a pilot signal. The base station transmits the reservation signal in the GP, so that an idle period of time in the GP can be shortened to thereby facilitate an access to the channel in the LTE-U system.

In a second scheme, there is a second interval between the start time of the signal transmission performed by the network device in the GP and the start time of the GP, a first interval between the end time of the signal transmission and the end time of the GP, and the sum of the length of the first interval and the second interval is less than or equal to that of a preset interval of time, where the length of the first interval is more than or equal to the smallest length of guard.

Preferably in this scheme, the UE may directly perform uplink transmission without CCA detection in the preset interval of time following the end of a DL signal transmission performed by the network device.

Figure 2C:
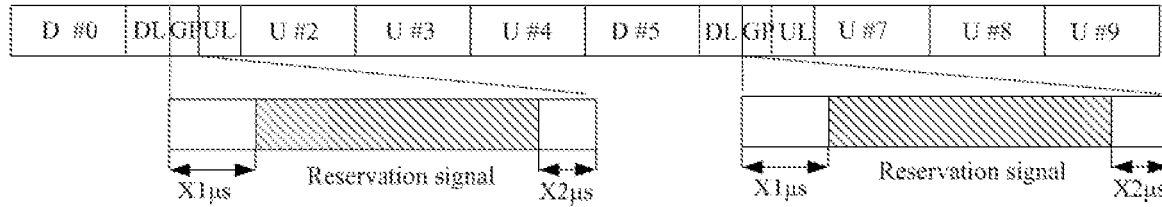
FIG. 2C shows a schematic diagram depicting a first mode in which a signal is transmitted by a user equipment in a GP according to an embodiment of the invention.

By way of an example, as illustrated in FIG. 2C, the GP is in a special sub-frame, and the base station transmits the reservation signal at the time X1 μs after the start time of the GP and ends the transmission at the time X2 μs before the end time of the GP, where the sum of X1 and X2 is less than or equal to the preset interval of time. Accordingly the successfully scheduled UE may directly perform the uplink transmission without CCA detection at the end of the signal transmission performed by the base station.

In another preferred implementation, the method further includes:

the UE performs CCA detection in a timeslot for channel detection, where the timeslot for channel detection is located in the GP, or in a sub-frame following the end of the GP; and if the current channel being idle is detected, then the UE will transmit the signal over the current channel; or if the current channel being occupied is detected, then the UE will not occupy the current channel.

Figure 2D:
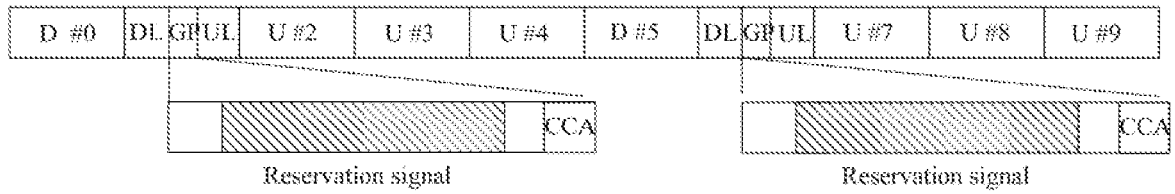
FIG. 2D shows a schematic diagram depicting a second mode in which a signal is transmitted by a user equipment in a GP according to an embodiment of the invention.

By way of an example, as illustrated in FIG. 2D, the GP is in a special sub-frame, and the base station transmits the reservation signal at the time X1 μs after the start time of the GP and ends the transmission at the time X2 μs before the end time of the GP, where the sum of X1 and X2 is less than or equal to the preset interval of time. Accordingly the successfully scheduled UE detects the current channel in a CCA timeslot in the GP; and if the current channel is idle, then the UE will access the channel, or if the current channel is busy, then the UE will abort the current access. The UE transmits a signal immediately after accessing the channel in the GP, where the signal may be one of a reservation signal, uplink data, or a pilot signal. The base station transmits the reservation signal in the GP, so that an idle period of time in the GP can be shortened to thereby facilitate an access to the channel in the LTE-U system.

It shall be noted that the GP in the embodiment of the invention can alternatively be configured at another position than in a special sub-frame. It is determined in CCA detection by energy detection whether there is a signal being transmitted over the current channel to thereby determine whether the channel is occupied.

In the second instance, the communication device is a UE.

In this instance, the user equipment transmits the signal in the GP in the following three preferable schemes.

In a first scheme, the signal transmitted by the user equipment in the GP includes a reservation signal indicating that the current channel is occupied.

Preferably the reservation signal occupies at least a partial OFDM symbol, that is, the reservation signal occupies at least a part of the OFDM symbol.

In this scheme, if the GP is more than one OFDM symbol, then preferably the signal transmitted by the user equipment in the GP will further include an uplink signal transmitted from the user equipment to a network device, e.g., uplink data, a pilot signal, etc.

In this scheme, the user equipment transmits the signal in the GP in the following two preferable implementations.

1. The end time of the signal transmission performed by the user equipment in the GP is the end time of the GP, and there is a second interval between the start time of the signal transmission performed by the user equipment in the GP and the start time of the GP, where the length of the second interval is less than or equal to that of a preset interval of time, and more than or equal to the smallest length of guard.

Figure 2E:
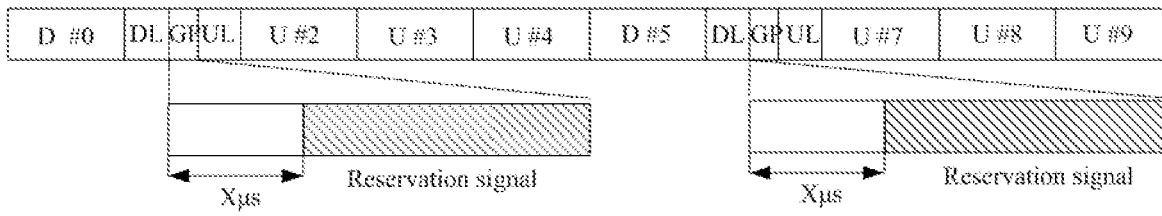
FIG. 2E shows a schematic diagram depicting a third mode in which a signal is transmitted by a user equipment in a GP according to an embodiment of the invention.

By way of an example, as illustrated in FIG. 2E, the GP is in a special sub-frame, there is no signal transmitted in first Xμs in the GP (i.e., the length of second interval), and the successfully scheduled UE transmits the reservation signal at the time Xμs after the start time of the GP, where X is less than or equal to the preset interval of time, so that the UE can perform uplink transmission directly without CCA detection at the end of the GP.

2. The sum of, a length of second interval between the start time of the signal transmission performed by the user equipment in the GP and the start time of the GP, and a length of the first interval between the end time of the signal transmission and the end time of the GP, is less than or equal to a preset interval of time, and more than or equal to the smallest length of guard.

In a second scheme, the signal transmitted by the UE in the GP is an uplink signal to be transmitted from the UE to a network device in an uplink sub-frame following the end of the GP.

In this scheme, the UE advances the transmission of the uplink signal to be transmitted from the UE to the network device in the uplink sub-frame following the end of the GP, and transmits the uplink signal in the GP to occupy the current channel. In this scheme, neither the network device nor the user equipment will transmit the reservation signal in the GP.

In this scheme, the length of the second interval between the start time of the signal transmission performed by the UE in the GP, and the start time of the GP is less than or equal to that of a preset interval of time, and is more than or equal to the smallest length of guard.

Figure 2F:
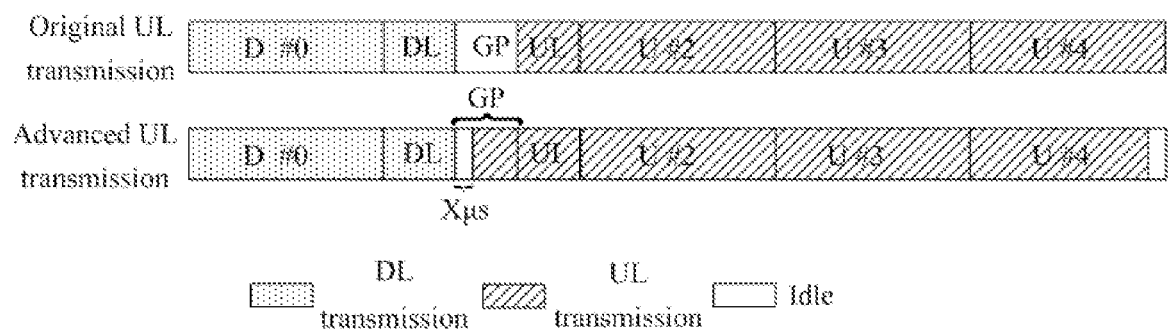
FIG. 2F shows a schematic diagram depicting a fourth mode in which a signal is transmitted by a user equipment in a GP according to an embodiment of the invention.

By way of an example, as illustrated in FIG. 2F, the start time of uplink transmission from the UE is advanced from an uplink sub-frame following the end of the GP to the time Xμs following the start time of the GP, where X is less than or equal to the preset interval of time, and more than or equal to the smallest length of guard. Since the start time of UL transmission is advanced, the corresponding end time of UL transmission is also advanced. The start time of UL transmission is advanced without affecting an alignment relationship between a licensed primary carrier and an LAA carrier.

In the first scheme or the second scheme, the UE transmits the signal in the GP to occupy the current channel, so that the UE may perform uplink transmission directly without CCA detection after transmitting the signal.

In a third scheme, the communication device is a UE, and before the communication device transmits the signal in the GP, the method further includes: the communication device performs CCA detection on the current channel in a timeslot for channel detection in the GP; and if the current channel being idle is detected, then the UE will transmit the signal; or if the current channel being occupied is detected, then the UE will not occupy the current channel.

In this scheme, the signal transmitted by the UE includes a reservation signal indicating that the current channel is occupied.

If the GP is more than one OFDM symbol, then preferably the signal transmitted by the UE in the GP will further include an uplink signal transmitted by the UE to a network device.

This scheme is preferably applicable in the case that the length of time of downlink transmission from the network device has reached the specified largest channel occupancy period of time, or the smallest length of guard is larger than a preset interval of time.

Figure 2G:
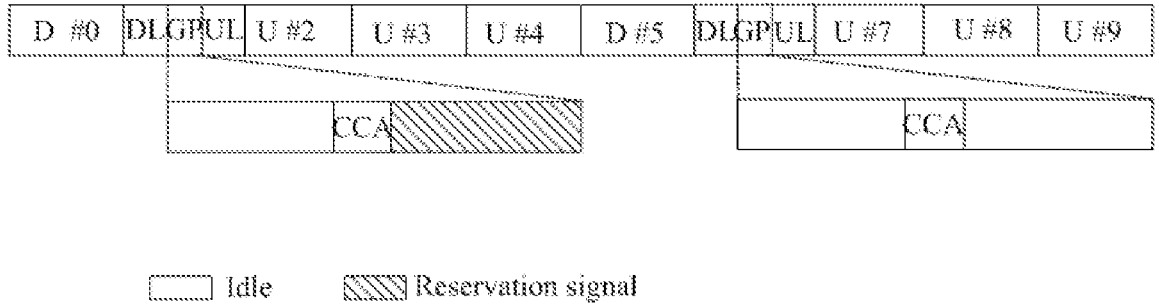
FIG. 2G shows a schematic diagram depicting a fifth mode in which a signal is transmitted by a user equipment in a GP according to an embodiment of the invention.

By way of an example, as illustrated in FIG. 2G, the successfully scheduled UE performs CCA detection in the GP to detect the channel, and to determine whether the channel is idle, and if the channel is idle, then the UE will access the channel, or if the channel is busy, then the UE will abort the current access. The CCA detection is performed typically from the time a preset interval of time after the start time of the GP. The UE transmits the signal immediately after accessing the channel in the GP, to occupy the channel.

Figure 3:
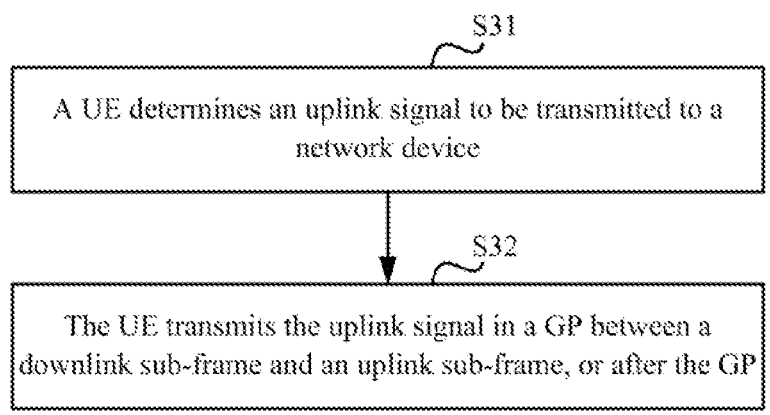
FIG. 3 shows a schematic flow chart of a second method for transmitting data according to an embodiment of the invention.

Based upon the same inventive idea, an embodiment of the invention further provides another method for transmitting data, which corresponds to such an executor of the method for transmitting data as illustrated in FIG. 1 that is a communication device. As illustrated in FIG. 3, the method includes:

in the operation S31, a UE determines an uplink signal to be transmitted to a network device; and in the operation S32, the UE transmits the uplink signal in a GP between a downlink sub-frame and an uplink sub-frame, or after the GP.

In an implementation, the length of interval between the start time of the uplink signal transmission performed by the UE, and the end time of the signal transmission performed by the network device in the GP is more than or equal to a preset length of guard.

Preferably before the operation S32, the method further includes: the UE performs CCA detection in a timeslot for channel detection in the GP; and if the current channel being idle is detected, then in the operation S32, the UE will the transmit the uplink signal in the current channel.

In another implementation, if the current channel being occupied is detected, then the UE will abort accessing the current channel.

In an implementation, the signal transmitted by the network device includes a reservation signal indicating that the current channel is occupied.

The signal transmitted by the UE is a reservation signal indicating that the current channel is occupied, or the uplink signal transmitted by the UE to the network device, where the uplink signal transmitted by the UE to the network device can be uplink data, or can be a pilot signal.

Preferably the signal transmitted by the network device further includes a downlink signal transmitted by the network device to the UE, where the downlink signal transmitted by the network device to the UE can be downlink data, or can be a pilot signal.

The processing flow of the method above can be performed in software program which can be stored in a storage medium, and when the stored software program is invoked, it performs the operations in the method above.

Figure 4:
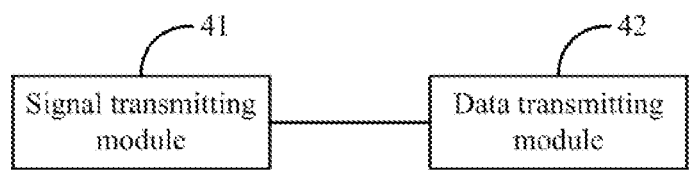
FIG. 4 shows a schematic diagram of a first communication device according to an embodiment of the invention.

Based upon the same inventive conception, an embodiment of the invention further provides a communication device corresponding to the method for transmitting data as illustrated in FIG. 1, and as illustrated in FIG. 4, the communication device includes:

a signal transmitting module 41 configured to transmit a signal in a GP between a downlink sub-frame and an uplink sub-frame to occupy the current channel; and a data transmitting module 42 configured to transmit data over the current channel.

In a preferable implementation, the signal includes a reservation signal indicating that the current channel is occupied.

Preferably if the communication device is a network device, then the signal will further include a downlink signal transmitted from the network device to a UE.

If the communication device is a UE, then the signal will further include an uplink signal transmitted from the UE to a network device.

In an implementation, the communication device is a network device, the start time of the signal transmission is the start time of the GP, and there is a first interval between the end time of the signal, and the end time of the GP, where the length of the first interval is less than or equal to that of a preset interval of time, and more than or equal to the smallest length of guard.

In an implementation, if the communication device is a network device, then the sum of the length of a second interval and a first interval will be less than or equal to that of a preset interval of time, where the length of the first interval is more than or equal to the smallest length of guard; or if the communication device is a UE, then the sum of the length of a second interval and a first interval will be less than or equal to that of a preset interval of time, where the length of the second interval is more than or equal to the smallest length of guard;

where the length of the first interval is the length of interval between the end time of the signal transmission, and the end time of the GP, and the length of the second interval is the length of interval between the start time of the signal transmission, and the start time of the GP.

In an implementation, the communication device is a UE, and there is a second interval between the start time of the signal transmission and the start time of the GP, where the length of the second interval is less than or equal to that of a preset interval of time, and more than or equal to the smallest length of guard.

Preferably the communication device is a UE, and the communication device further includes:

a CCA detecting module configured to perform CCA detection on the current channel in a timeslot for channel detection in the GP; and the signal transmitting module is configured to transmit the signal in the GP if the CCA detecting module detects the current channel being idle.

In another preferable implementation, the communication device is a UE, the signal is an uplink signal to be transmitted by the UE to a network device in an uplink sub-frame following the end of the GP, and there is a second interval between the start time of the signal transmission and the start time of the GP, where the length of the second interval is less than or equal to that of a preset interval of time.

Figure 5:
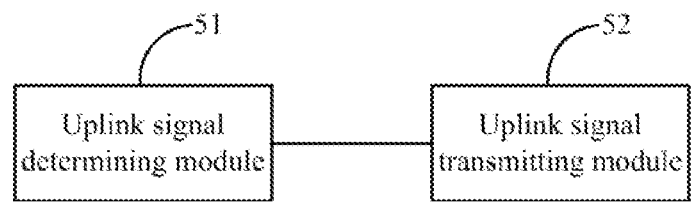
FIG. 5 shows a schematic diagram of a first user equipment according to an embodiment of the invention.

Based upon the same inventive idea, an embodiment of the invention further provides a UE corresponding to the method for transmitting data as illustrated in FIG. 3, and as illustrated in FIG. 5, the UE includes:

an uplink signal determining module 51 configured to determine an uplink signal to be transmitted to a network device; and an uplink signal transmitting module 52 configured to transmit the uplink signal in a GP between a downlink sub-frame and an uplink sub-frame, or after the GP.

In an implementation, the length of interval between the start time of the uplink signal transmission, and the end time of the signal transmission performed by the network device in the GP is more than or equal to a preset length of guard.

Preferably the UE further includes:

a CCA detecting module configured to perform CCA detection in a timeslot for channel detection in the GP; and the uplink signal transmitting module is further configured to transmit the uplink signal over the current channel if the CCA detecting module detects the current channel being idle.

In an implementation, the signal transmitted by the network device includes a reservation signal indicating that the current channel is occupied.

The signal transmitted by the UE includes a reservation signal indicating that the current channel is occupied, or the uplink signal transmitted by the user equipment to the network device.

Preferably the signal transmitted by the network device further includes a downlink signal transmitted by the network device to the UE.

The structure of and processing in the communication device according to the embodiment of the invention corresponding to the method for transmitting data as illustrated in FIG. 1 will be described below in connection with a preferable hardware structure thereof.

Figure 6:
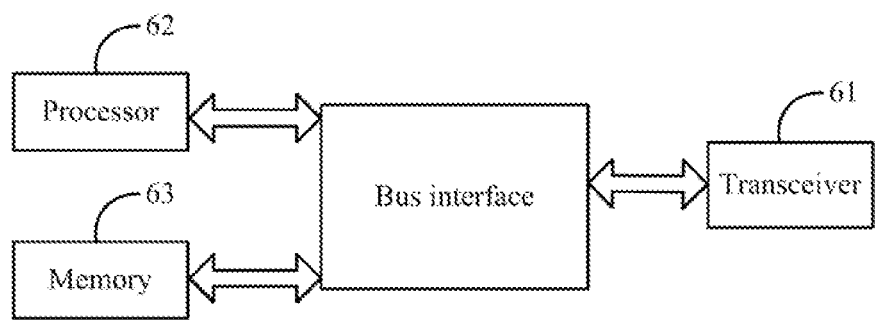
FIG. 6 shows a schematic diagram of a second communication device according to an embodiment of the invention.

In an embodiment as illustrated in FIG. 6, the communication device includes a transceiver 61, and at least one processor 62 connected with the transceiver 61, where:

the processor 62 is configured to read and execute program in a memory 63:

to trigger the transceiver 61 to transmit a signal in a GP between a downlink sub-frame and an uplink sub-frame to occupy the current channel; and to transmit data over the current channel.

Here in FIG. 6, the bus architecture can include any number of interconnecting buses and bridges to particularly link together various circuits including one or more processors represented by the processor 62, and one or more memories represented by the memory 63. The bus architecture can further link together various other circuits, e.g., peripheral devices, manostats, power management circuits, etc., all of which are well known in the art, so a further description thereof will be omitted in this context. The bus interface serves as an interface. The transceiver 61 can include a quantity of elements, e.g., a transmitter and a receiver, which are units for communication with various other devices over a transmission medium.

The processor 62 is responsible for managing the bus architecture and performing normal processes, and the memory 63 can store data for use by the processor 62 in performing the operations.

In a preferable implementation, the signal includes a reservation signal indicating that the current channel is occupied.

Preferably if the communication device is a network device, then the signal will further include a downlink signal transmitted from the network device to a UE.

If the communication device is a UE, then the signal will further include an uplink signal transmitted from the UE to a network device.

In an implementation, the communication device is a network device, the start time of the signal transmission is the start time of the GP, and there is a first interval between the end time of the signal transmission and the end time of the GP, where the length of the first interval is less than or equal to that of a preset interval of time, and more than or equal to the smallest length of guard.

In an implementation, if the communication device is a network device, then the sum of the length of the second interval and the first interval will be less than or equal to that of a preset interval of time, and the length of the first interval is more than or equal to the smallest length of guard; or if the communication device is a UE, then the sum of the length of the second interval and the first interval will be less than or equal to that of a preset interval of time, and the length of the second interval is more than or equal to the smallest length of guard;

where the length of the first interval is the length of interval between the end time of the signal transmission and the end time of the GP, and the length of the second interval is the length of interval between the start time of the signal transmission and the start time of the GP.

In an implementation, the communication device is a UE, and there is a second interval between the start time of the signal transmission and the start time of the GP, where the length of the second interval is less than or equal to that of a preset interval of time, and more than or equal to the smallest length of guard.

Preferably the communication device is a UE, and the processor 62 is further configured: to perform CCA detection on the current channel in a timeslot for channel detection in the GP; and to transmit the signal in the GP if the current channel being idle is detected.

In another preferable implementation, the communication device is a UE, the signal is an uplink signal to be transmitted by the UE to a network device in an uplink sub-frame following the end of the GP, and there is a length of the second interval between the start time of the signal transmission and the start time of the GP, where the length of the second interval is less than or equal to a preset interval of time.

The structure of and processing in the UE according to the embodiment of the invention corresponding to the method for transmitting data as illustrated in FIG. 3 will be described below in connection with a preferable hardware structure thereof.

Figure 7:
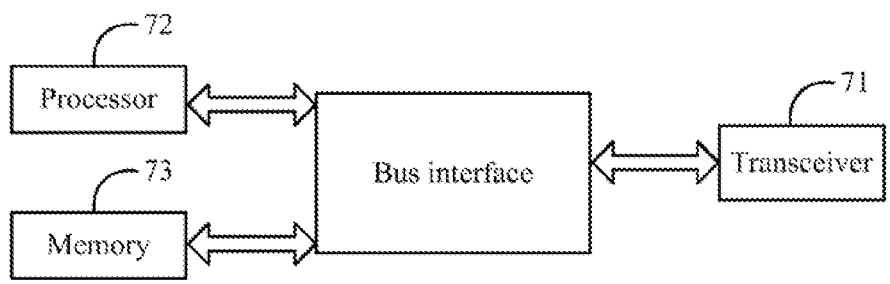
FIG. 7 shows a schematic diagram of a second user equipment according to an embodiment of the invention.

In an embodiment as illustrated in FIG. 7, the UE includes a transceiver 71, and at least one processor 72 connected with the transceiver 71, where:

the processor 72 is configured to read and execute program in a memory 73:

to determine an uplink signal to be transmitted to a network device; and to trigger the transceiver 71 to transmit the uplink signal in a GP between a downlink sub-frame and an uplink sub-frame, or after the GP.

Here in FIG. 7, the bus architecture can include any number of interconnecting buses and bridges to particularly link together various circuits including one or more processors represented by the processor 72, and one or more memories represented by the memory 73. The bus architecture can further link together various other circuits, e.g., peripheral devices, manostats, power management circuits, etc., all of which are well known in the art, so a further description thereof will be omitted in this context. The bus interface serves as an interface. The transceiver 71 can include a number of elements, e.g., a transmitter and a receiver, which are units for communication with various other devices over a transmission medium.

The processor 72 is responsible for managing the bus architecture and performing normal processes, and the memory 73 can store data for use by the processor 72 in performing the operations.

In an implementation, the length of interval between the start time of the uplink signal transmission, and the end time of the signal transmission performed by the network device in the GP is more than or equal to a preset length of guard.

Preferably the processor 72 is further configured:

to perform CCA detection in a timeslot for channel detection in the GP; and to trigger the transceiver 71 to transmit the uplink signal over the current channel if the current channel being idle is detected.

In an implementation, the signal transmitted by the network device includes a reservation signal indicating that the current channel is occupied.

The signal transmitted by the UE includes a reservation signal indicating that the current channel is occupied, or the uplink signal transmitted by the user equipment to the network device.

Preferably the signal transmitted by the network device further includes a downlink signal transmitted by the network device to the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, the method comprising:
   transmitting, by a communication device, a signal in a switching duration between a downlink sub-frame and an uplink sub-frame to occupy a current channel; and
   transmitting, by the communication device, data over the current channel;
   when the communication device is a network device, then a sum of a second interval and a first interval is less than or equal to that of a preset interval of time, and the length of the first interval is more than or equal to a smallest length of guard; or when the communication device is a User Equipment, UE, then the sum of the length of the second interval and the first interval is less than or equal to that of the preset interval of time, and the length of the second interval is more than or equal to the smallest length of guard;
   wherein the length of the first interval is a length of interval between end time of the signal transmitted in the switching duration and end time of the switching duration, and the length of the second interval is a length of interval between start time of the signal transmitted in the switching duration and start time of the switching duration.

2. The method according to claim 1, wherein the communication device is a User Equipment, UE;
   before the communication device transmits the signal in the switching duration, the method further comprises:
   performing, by the communication device, Clear Channel Assessment, CCA, detection on the current channel in a timeslot for channel detection in the switching duration; and
   transmitting, by the communication device, the signal in the switching duration comprises: transmitting, by the communication device, the signal in the switching duration if the current channel being idle is detected.

3. The method according to claim 1, wherein the signal comprises a reservation signal indicating that the current channel is occupied;
- wherein if the communication device is a network device, then the signal further comprises a downlink signal transmitted from the network device to a User Equipment, UE; and
- if the communication device is a UE, the signal further comprises an uplink signal transmitted from the UE to a network device.

4. A communication device, comprising:
- a memory and a processor;
- wherein the processor is configured to read and execute program in the memory, to transmit a signal in a switching duration between a downlink sub-frame and an uplink sub-frame to occupy a current channel; and to transmit data over the current channel;
- when the communication device is a network device, then a sum of a second interval and a first interval is less than or equal to that of a preset interval of time, and the length of the first interval is more than or equal to a smallest length of guard; or when the communication device is a User Equipment, UE, then the sum of the length of the second interval and the first interval is less than or equal to that of the preset interval of time, and the length of the second interval is more than or equal to the smallest length of guard;
- wherein the length of the first interval is a length of interval between end time of the signal transmitted in the switching duration and end time of the switching duration, and the length of the second interval is a length of interval between start time of the signal transmitted in the switching duration and start time of the switching duration.

5. The communication device according to claim 4, wherein the communication device is a User Equipment, UE, and the processor is further configured to perform CCA detection on the current channel in a timeslot for channel detection in the switching duration; and to transmit the signal in the switching duration if the processor detects the current channel being idle.

6. The communication device according to claim 4, wherein the signal comprises a reservation signal indicating that the current channel is occupied;
- wherein if the communication device is a network device, then the signal further comprises a downlink signal transmitted from the network device to a User Equipment, UE; and
- if the communication device is a UE, the signal further comprises an uplink signal transmitted from the UE to a network device.

* * * * *